United States Patent [19]

Robinson

[11] Patent Number: 5,085,841

[45] Date of Patent: Feb. 4, 1992

[54] METHOD FOR REDUCTION OF POLLUTION FROM COMBUSTION CHAMBERS

[76] Inventor: Barnett J. Robinson, 501 Boylston St., Brookline, Mass. 02146

[21] Appl. No.: 553,436

[22] Filed: Jul. 13, 1990

[51] Int. Cl.$^5$ .................. B01J 8/02; C01B 21/00; C01B 17/10
[52] U.S. Cl. ....................... 423/213.5; 423/224; 502/103; 502/326
[58] Field of Search .................. 502/103, 326; 423/213.5, 224

[56] References Cited

U.S. PATENT DOCUMENTS

| | | | |
|---|---|---|---|
| 4,157,316 | 6/1977 | Thompson et al. | 423/213.5 |
| 4,295,816 | 10/1981 | Robinson | 261/18.2 |
| 4,475,483 | 10/1984 | Robinson | 261/18.2 |
| 4,497,783 | 2/1985 | Barber | 423/213.5 |
| 4,621,071 | 11/1986 | Blanchard et al. | 423/213.5 |

OTHER PUBLICATIONS

R. M. Montano et al, Simultaneous Reduction of Soot and NO$_x$ in Diesel Engines by Homogeneous Catalysis of Group Platinum Metals, The Society of Automotive Engineers, Aug. 1989.

Primary Examiner—Gregory A. Heller
Attorney, Agent, or Firm—David M. Warren

[57] ABSTRACT

A catalyst mixture of platinum, rhodium, and rhenium is employed in the combustion of gaseous, liquid and/or solid fuel in combustion chambers such as diesel and gasoline engines, for reduction of pollution emitted from the combustion chambers. The platinum serves as a catalyst with carbon and carbon monoxide to produce carbon dioxide, the rhodium serves for reducing oxides of nitrogen to nitrogen gas and oxygen gas, and the rhenium serves as a catalytic promoter for the catalytic functions of the platinum and the rhodium. The rhodium also promotes the catalytic action of the platinum. The catalytic mixture is introduced into a flame zone of a combustion chamber in any convenient manner, such as by use of an air draft. The composition of the mixture is as follows, namely, 1–9 milligrams of platinum, 0.3–3 milligrams rhodium, and 0.3–3 milligrams rhenium for treating 24 kilograms of fuel.

6 Claims, 2 Drawing Sheets

NOx AND CO EMISSIONS

METHOD FOR REDUCTION OF POLLUTION FROM COMBUSTION CHAMBERS

BACKGROUND OF THE INVENTION

The present invention relates to a method for reduction of pollution emitted from combustion chambers. More specifically the invention relates to a method for reduction of pollution emitted from combustion chambers as in diesel and gasoline engines in motor vehicles and chambers in which combustion of gaseous, liquid and/or solid fuel takes place. The reduction of pollution is achieved by rhodium, platinum and rhenium as catalysts.

It is well established that the major pollutants produced by combustion chambers are soot (carbon), carbon monoxide, and oxides of nitrogen hereinafter referred to as $NO_x$.

In recent years attempts were made to reduce pollution in various ways by using platinum-group catalysts but the results were only partially successful. In addition rhenium was used in order to increase the octane number in gasoline instead of using lead.

It became apparent that as combustion temperatures rose, soot and CO decreased but at the same time $NO_x$ increased, the latter being an undesirable result. On the other hand, if the combustion temperature is decreased, the $NO_x$ indeed drops, but the amount of soot and CO increases, and simultaneously the efficiency of the fuel utilization drops.

Attempts were made to use platinum as a catalyst for oxidizing the undesired carbon and the CO to $CO_2$ in combustion chambers. (See U.S. Pat. No. 4,295,816). This patent discloses use of the entire Platinum group for oxidation purposes, but refers primarily to platinum. Over the last decade platinum has been used as a homogeneous catalyst to oxidize C+CO to $CO_2$ in both engines and furnaces.

However, the problem remained as to how to reduce the $NO_x$ chemically to the gases $N_2$ and $O_2$, this being an exothermic reaction.

SUMMARY OF THE INVENTION

The purpose of the present invention is to oxidize the carbon and the carbon monoxide to $CO_2$ and simultaneously to reduce the $NO_x$ to $N_2$ and $O_2$ without one process being at the expense of the other.

According to the present invention the catalyst mixture is comprised of platinum, rhodium and rhenium. Wherein the platinum serves for oxidizing the carbon and CO to $CO_2$, the rhodium serves for reducing the $NO_x$ to $N_2$ and $O_2$, and the rhenium serves as a catalytic promoter for the catalysts platinum and rhodium. The rhodium also promotes the catalytic action of the platinum.

The rhenium enables the platinum and rhodium to fulfill their role optimally. A defined ratio must be maintained among the catalysts and between the quantities of catalysts and fuel.

The site at which said simultaneous oxidation and reduction takes place is the combustion chamber to which the catalysts are transported by various means. See for example U.S. Pat. Nos. 4,295,816 and 4,475,483.

The present invention relates to a method for reducing the pollution emitted from combustion chambers by the addition of the catalysts-platinum, rhodium and rhenium to the combustion chamber in specific proportions and in a specific ratio to the amount of fuel.

The introduction of the above mixture of catalysts into the combustion chamber leads to a simultaneous oxidation and reduction; Oxidation of carbon and CO to $CO_2$, and reduction of the $NO_x$ to $N_2$ and $O_2$.

According to the present invention the following amounts of catalysts should be used; 1-9 mg platinum, 0.3-3 mg rhodium and 0.3-4 mg rhenium per 24-2400 kg fuel. Optimally the following quantities should be used: 3.2 mg platinum, 1 mg rhodium, and 1 mg rhenium per 240 kg fuel.

BRIEF DESCRIPTION OF THE DRAWINGS

Drawings 1-4 serve to illustrate the effectiveness of the invention.

DETAILED DESCRIPTION

The catalysts may be introduced into the flame zone of the combustion chamber in any manner such as by transporting the catalysts by air to the combustion chamber as described in the U.S. Pat. No. 4,295,816.

The combustion chamber may be of any type such as engines or furnaces.

The reduction of pollution by simultaneous oxidation and reduction can occur only when the specific proportions among the components of the system are maintained.

Preparation of the catalyst mixture:

A mixture of 160 gr. platinum, 50 gr. rhodium and 50 gr. rhenium suffices to reduce pollution in 12 million liter fuel.

The mixture is prepared as follows:
400 gr. $H_2PtCl_6.6H_2O$ (CPA) in water
120 gr. $Rdcl_2$ in water
50 gr. rhenium in perrhenic acid in a total of 114 liters of liquid.

In order to reduce pollution in engines or furnaces by means of the equipment and method described in the above-mentioned U.S. patents, the catalytic mixture described above is divided into 6000 vials wherein each vial contains 19 ml liquid. Each such vial can reduce the pollution of 2000 liters of fuel in combustion chambers.

Up to the present, for reduction of pollution in combustion chambers 500 gr. of $H_2PtCl_6.6H_2O$ (CPA) has been used, without any addition of rhodium.

Although the U.S. Pat. No. 4,295,816 relates to the platinum-group metals for the reduction of pollution, it does so only with regard to the oxidation process of the carbon and the CO to $CO_2$ and does not relate to the rhodium and its function in the reduction of the $NO_x$.

Figure 1:
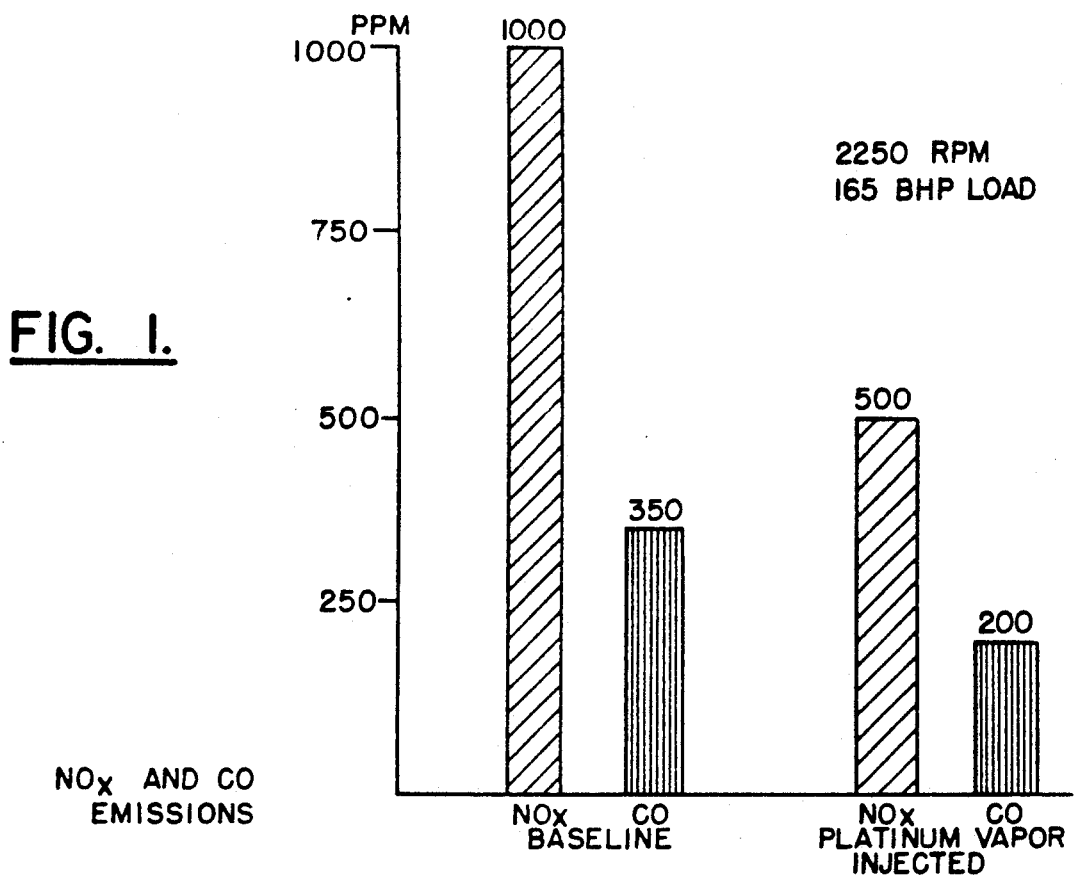
FIG. 1 illustrates the CO and $NO_x$ levels prior to and subsequent to the injection of the catalytic mixture to the combustion chamber of a motor vehicle diesel engine.

FIG. 1 shows a reduction of the CO and $NO_x$ pollution in diesel engines in a motor vehicle. Prior to the injection of the catalytic mixture, the pollution level was measured as NO$_x$ 1000 ppm and CO 350 ppm. Subsequent to the injection of the catalytic mixture, a significant reduction was noted in the NO$_x$ level which dropped to 500 ppm and the CO level which dropped to 200 ppm.

Figure 2:
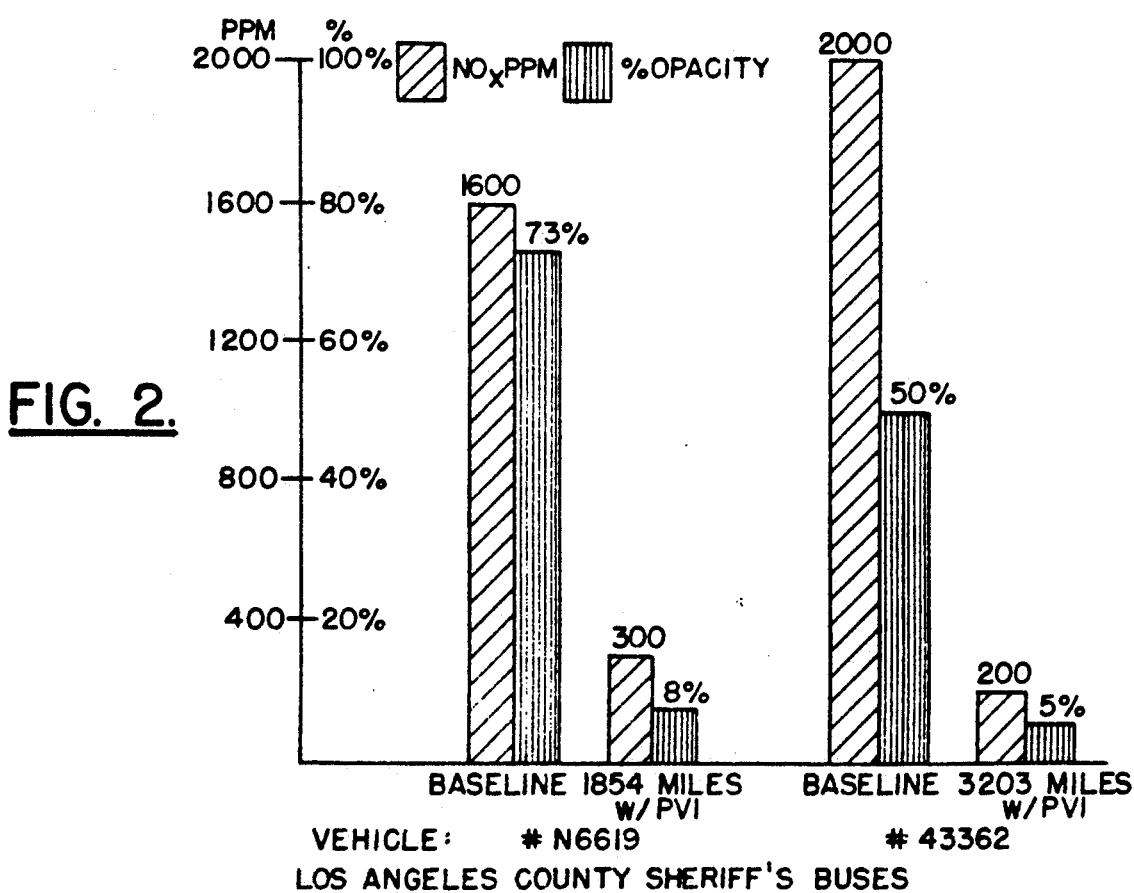
FIG. 2 illustrates the $NO_x$ and opacity levels prior to and subsequent to the injection of the catalytic mixture to the combustion chamber of two motor vehicle diesel engines. The opacity level relates to the degree of carbon in air.

FIG. 2 shows the decrease in pollution in two motor vehicles as a result of the injection of the catalysts mixture wherein the pollution was examined with regard to NO$_x$ and opacity. In one vehicle opacity declined from 73% to 8% and in the other from 50% to 5%. In the first vehicle the NO$_x$ dropped from 1600 ppm to 300 ppm, and in the second vehicle from 2000 ppm to 200 ppm. It should be noted that in the first vehicle the decrease in pollution was examined after 1845 miles after injection, and in the second—after 3203 miles.

Figure 3:
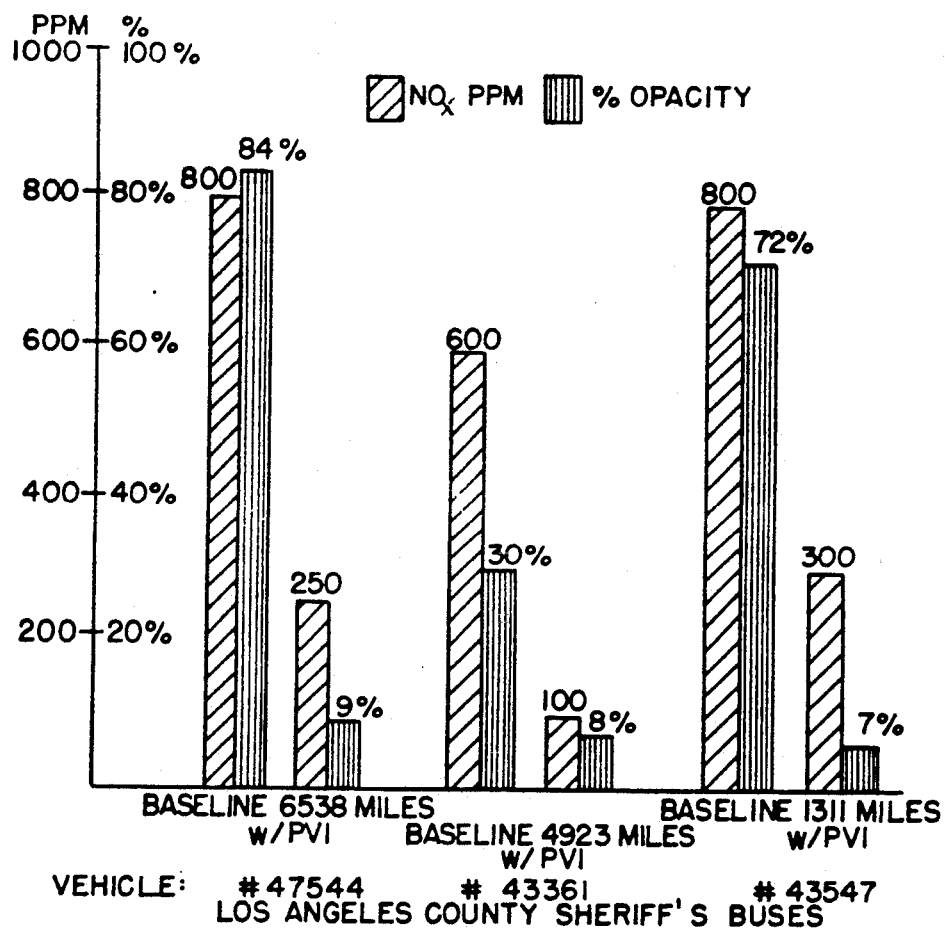
FIG. 3 illustrates the $NO_x$ and opacity levels of three additional motor vehicles.

FIG. 3 shows the decrease in pollution in three additional motor vehicles. The pollution test was conducted in the first vehicle 6538 miles after injection, and in the second vehicle—4925 miles after injection, and in the third vehicle—1311 miles after injection. In the first vehicle opacity decreased from 84% to 9% and the NO$_x$ decreased from 800 ppm to 250 ppm. In the second vehicle opacity decreased from 30% to 9% and the NO$_x$ from 600 ppm to 100 ppm, and in the third vehicle opacity decreased from 72% to 7% and the NO$_x$ from 800 ppm to 300 ppm.

Figure 4:
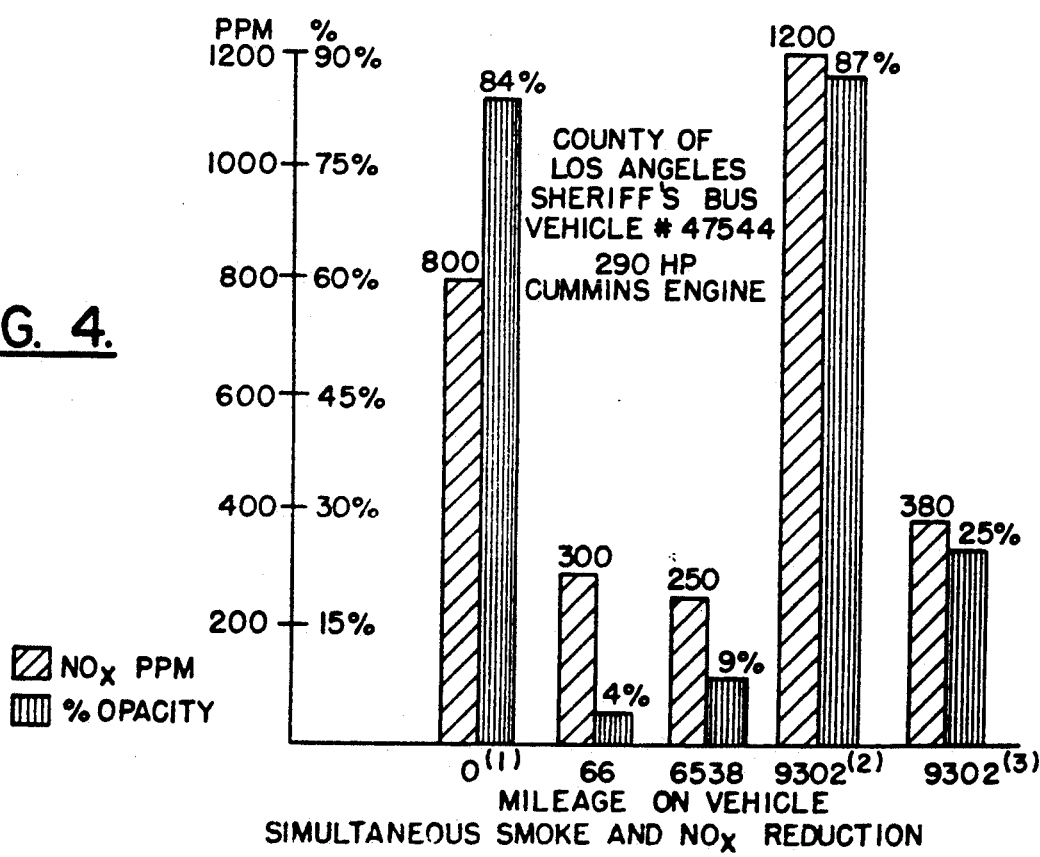
FIG. 4 illustrates the $NO_x$ and opacity levels prior to the injection and subsequent to the injection as examined at specified intervals over time, and after a second injection.

FIG. 4 refers to the decrease in pollution examined 66 6538 and 9302 miles respectively after the injection and immediately after another injection. After 66 and 6538 miles the NO$_x$ dropped from 800 ppm to 300 ppm and 250 ppm respectively, and the opacity dropped from 84% to 4% and 9% respectively. 9302 miles after injection a dramatic increase in pollution was noted due to the fact that no more of the catalytic mixture remained. A second injection and reexamination indicated an immediate and sharp drop in the pollution level. The NO$_x$ dropped from 1200 ppm to 380 ppm and opacity from 78% to 25%.

What is claimed is:

1. A method for reducing pollution emitted from combustion chambers during a combustion in air of a carbonaceous fuel, the method comprising a step of introducing a mixture of precious metals including platinum, rhodium and rhenium to the flame zone of combustion chambers homogeneously, wherein said mixture contains not more than 15 mg of said metals per 24 kg of fuel, said mixture is borne by gases in the flame zone during a combustion of the fuel for simultaneously enhancing oxidation of carbon of the fuel and inhibiting oxidation of nitrogen of the air, and said mixture contains 1-9 mg platinum, 0.3-3 mg rhodium and 0.3-3 mg rhenium.

2. A method according to claim 1 wherein said mixture contains 3.2 mg platinum, 1 mg rhodium and 1 mg rhenium per 24-2400 kg fuel.

3. A method according to claim 2 wherein said mixture contains 3.2 mg platinum, 1 mg rhodium and 1 mg rhenium per 240 kg fuel.

4. A method according to claim 1 wherein said mixture is introduced into the combustion chamber by air flow.

5. A method for reducing pollution emitted from a combustion chamber by introducing rhodium as a reduction catalyst or as an oxidation inhibitor, and introducing rhenium and platinum, via a stream of fluid to the combustion chamber, wherein there are 1-9 parts of platinum to 0.3-3 parts of rhodium to 0.3-4 parts of rhenium by mass ratio in the chamber during a combusting of fuel in the chamber.

6. A method according to claim 5 wherein said platinum and said rhodium and said rhenium are present in said chamber concurrently with a carbonaceous fuel, there being 1-9 mg platinum, 0.3-3 mg rhodium and 0.3-4 mg rhenium employed with 24-2400 kg fuel.

* * * * *